United States Patent
Critchley et al.

(10) Patent No.: US 7,624,308 B2
(45) Date of Patent: Nov. 24, 2009

(54) FAILED MESSAGE ERROR RECOVERY USING APPLICATION SPECIFIC ERROR QUEUES

(75) Inventors: Craig A. Critchley, Fall City, WA (US); Richard D. Hill, Kirkland, WA (US); Krishnan Srinivasan, Kirkland, WA (US); Uday S. Hedge, Bellevue, WA (US); Alexander Dadiomov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 983 days.

(21) Appl. No.: 11/091,631

(22) Filed: Mar. 28, 2005

(65) Prior Publication Data

US 2006/0218238 A1 Sep. 28, 2006

(51) Int. Cl.
*G06F 11/00* (2006.01)
(52) U.S. Cl. .................. 714/47; 709/213; 370/212; 370/217; 714/4; 714/48
(58) Field of Classification Search .............. 714/47, 714/48; 709/213; 370/217
See application file for complete search history.

(56) References Cited

U.S. PATENT DOCUMENTS

| | | | |
|---|---|---|---|
| 6,154,847 A * | 11/2000 | Schofield et al. ............... 714/4 |
| 6,434,605 B1 * | 8/2002 | Faulkner et al. ............. 709/213 |
| 6,493,826 B1 * | 12/2002 | Schofield et al. ............... 726/22 |
| 6,650,652 B1 * | 11/2003 | Valencia ..................... 370/433 |
| 7,047,532 B1 * | 5/2006 | Connelly .................... 719/310 |
| 7,353,285 B2 * | 4/2008 | Bai et al. .................... 709/235 |
| 2002/0064126 A1 * | 5/2002 | Bhattal et al. ............... 370/217 |
| 2002/0178177 A1 * | 11/2002 | Park et al. .................... 707/202 |
| 2002/0178232 A1 * | 11/2002 | Ferguson ..................... 709/217 |
| 2003/0058880 A1 * | 3/2003 | Sarkinen et al. ............. 370/413 |
| 2003/0110344 A1 * | 6/2003 | Szczepanek et al. ........ 711/100 |
| 2006/0200705 A1 * | 9/2006 | Burger et al. ................. 714/47 |

* cited by examiner

*Primary Examiner*—Christopher S McCarthy
*Assistant Examiner*—Jeison C Arcos
(74) *Attorney, Agent, or Firm*—Workman Nydegger

(57) ABSTRACT

The present invention extends to methods, systems, and computer program products for failed message error recovery using application specific error queues. An application message, a reference to a receive queue that corresponds to a receiving application, and a reference to an application specific error queue specific to a sending application are received from the sending application. The application message is enqueued in a transmission queue. Transfer of the application message to the receive queue is attempted. It is detected that the application message was not delivered to the receiving application due to an error. The application message is moved from the transmission queue to the application specific error queue. The application message and appropriate error information is returned from the application specific error queue to the sending application.

18 Claims, 4 Drawing Sheets

FAILED MESSAGE ERROR RECOVERY USING APPLICATION SPECIFIC ERROR QUEUES

CROSS-REFERENCE TO RELATED APPLICATIONS

Not applicable.

BACKGROUND OF THE INVENTION

1. The Field of the Invention

The present invention relates to electronic messaging and, more particularly, to failed message error recovery using application specific error queues.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "sending computing system") constructs or otherwise accesses an electronic message and transmits the electronic message over a network to another computing system (referred to herein as a "receiving computing system"). The electronic message may be read by a human user as when the electronic message is an e-mail or instant message, or may be read, instead, by an application running on the receiving computing system. The electronic message may be constructed by an application running on the sending computing system with the possible assistance of a human user.

In some environments, applications communicate with one another using queued message communication. Queued communication includes mechanisms for a sending application to write a message into a sending queue, the sending queue to transfer the message to a receiving queue, and for a receiving application to read the message from the receiving queue. The queues maintain communication state outside of the communicating parties, and provide a level of indirection between them. Accordingly, queued messaging provides reliable communication between loosely coupled applications. Senders and receivers of messages use intermediary queue managers to communicate, and may independently shut down and restart and may even have non-overlapping lifetimes. Queuing also allows clients and servers to send and receive messages "at their own pace" with the queue taking up the slack at either end Similar to other types of messaging, queued messaging can fail for a variety of reasons. For example, an application may never run, and its messages will sit undelivered in a queue indefinitely. The sender's queue manager may be unable to connect to a receiver's queue manager. The receiver may reject the message for security or protocol-compliance reasons.

Reliability requires that errors be detected and handled. A message that cannot be successfully transferred or delivered should be reported. For example, if a message specifies the transfer of money from one account to another, the fact that the message could not be delivered needs to be reported to the client requesting the transfer. Because queued applications may shut down and restart before a message is delivered, reports of errors require persistent state. Typically, messages that fail are moved to so-called "dead queues", which are queues similar to application queues, except that they hold messages that have failed. Each queue typically has a corresponding dead queue where it moves all messages that can not be delivered.

Thus, typically there is a single dead queue per queue manager. Thus, multiple applications at a computer system will often share the same dead queue. Sharing a queue manager among more than one application can be difficult if a particular application wishes to determine which of its messages could not be delivered. For example, referring back to the example of transferring money, an application may wish to find its undelivered message and report it to a user (e.g., through a user-interface) to provide the user the account, amount, and other information in the message along with any system diagnostic that indicated why the message went undelivered. Thus, if there is a single error queue per queue manager, then either the application must search the error queue for relevant errors, or the application must have the whole queue manager to itself. Unfortunately, searching a system-wide failed message queue for messages for a specific application requires cooperation between applications (which may not always be possible) and can be slow.

Each application that utilizes a shared message queue is typically given full access to the shared message queue. Full access allows each application to search for and retrieve its messages when a failure occurs. Unfortunately, when multiple applications share a failed message queue, data from one application can be exposed to other applications, which may be undesirable. For example, when a banking transaction fails, messages of the banking transaction can be transferred to the common failed message queue. These banking transaction messages are then visible to other applications that share the failed message queue. Thus, applications that would otherwise be prevented from accessing and/or manipulating the banking transaction messages on the wire may access and/or manipulate the banking transaction messages in the shared failed message queue In some environments, it may be that each application has a corresponding queue manager and that each queue manager manages a corresponding failed message queue. Thus, these environments provide failed message queue isolation through the use of multiple queue managers and multiple corresponding failed message queues such that each failed message queue is utilized by a single corresponding application. However, operation and maintenance of multiple different queue managers and of message transfers over a corresponding number of transfer pipes to the different queue managers can significantly affect the performance of computer systems that implement such an arrangement.

Therefore systems, methods, and computer program products that facilitate failed message recovery using application specific error queues would be advantageous.

BRIEF SUMMARY OF THE INVENTION

The foregoing problems with the prior state of the art are overcome by the principles of the present invention, which are directed towards methods, systems, and computer program products for failed message recovery using application specific error queues. A queue manager receives an application message, a reference to a receive queue that corresponds to a receiving application, and a reference to an application specific error queue specific to a sending application, from the sending application. The queue manager enqueues the application message in a transmission queue.

The queue manager attempts to transfer the application message to the receive queue. The queue manager detects that the application message was not delivered to the receiving application due to an error. The queue manager moves the application message from the transmission queue to the application specific error queue in response to detecting that the application message was not delivered. The application message and appropriate error information is transferred from the application specific error queue to an error processing application subsequent to moving the application message to the application specific error queue.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1A:
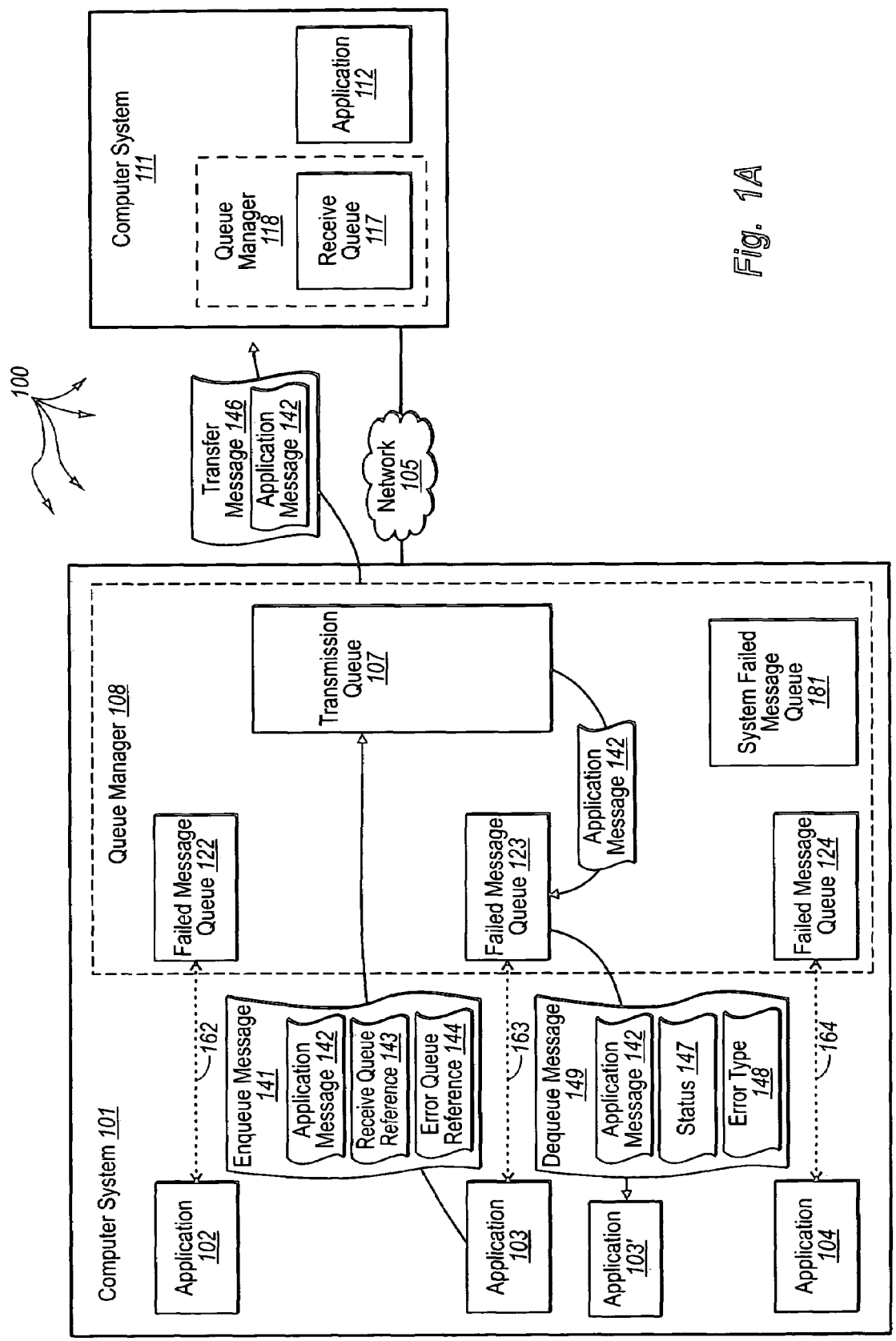
FIGS. 1A and 1B illustrates an example of a computer architecture that facilitates failed message recovery using application specific error queues.

The principles of the present invention provide for failed message recovery using application specific error queues. A queue manager receives an application message, a reference to a receive queue that corresponds to a receiving application, and a reference to an application specific error queue specific to a sending application, from the sending application. The queue manager enqueues the application message in a transmission queue.

The queue manager attempts to transfer the application message to the receive queue. The queue manager detects that the application message was not delivered to the receiving application due to an error. The queue manager moves the application message from the transmission queue to the application specific error queue in response to detecting that the application message was not delivered. The application message and appropriate error information is transferred from the application specific error queue to an error processing application subsequent to moving the application message to the application specific error queue. The error processing application can be the sending application or a different error processing application configured to process failed messages for the sending application.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of z computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1B:
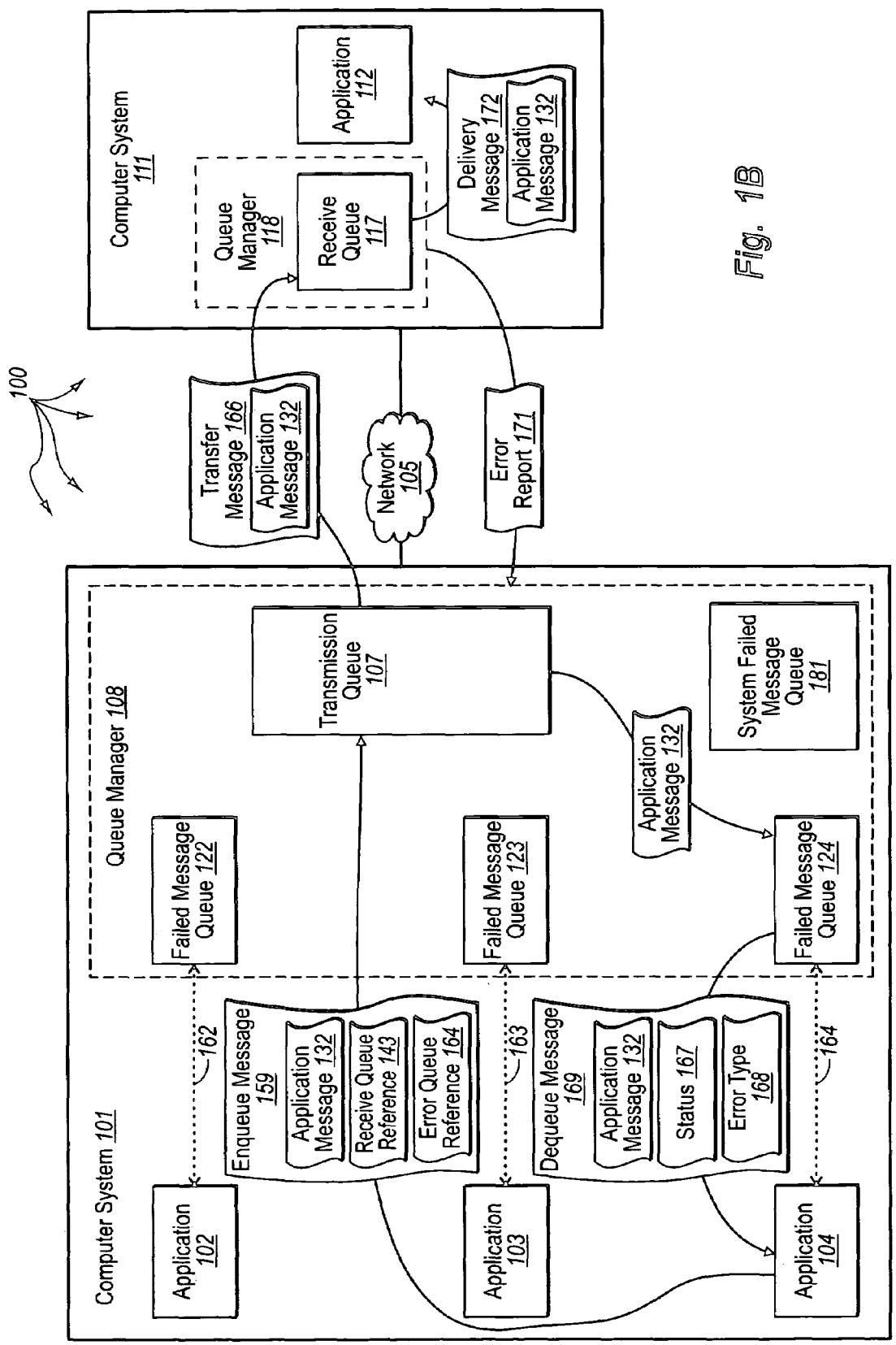

FIGS. 1A and 1B illustrate an example of a computer architecture 100 that facilitates failed message recovery using application specific error queues. Depicted in computer architecture 100 are computer system 101, network 105, and computer system 111. Each of the computer systems 101 and 111 are connected to network 105, such as, for example, a Local Area Network ("LAN"), a Wide Area Network ("WAN"), or even the Internet. Computer systems connected network 105 can receive data from and send data to other computer systems connected network 105. Accordingly, computer systems 101 and 111, as well as other connected computer systems (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, computer systems 101 and 111 create SOAP envelopes, exchange SOAP envelopes over network 105, and receive SOAP envelopes.

Computer system 101 includes applications 102, 103, 103', and 104 and queue manager 108. Applications 102, 103, and 104 can be portions of distributed applications, such as, for example, implementing Web services. Application 103' can be an application that processes failed messages for application 103. Queue manager 108 includes failed message queues 122, 123, and 124, system failed message queue 181, and transmission queue 107. Queue manager 108 controls failed message queues 122, 123, and 124, system failed message queue 181, and transmission queue 107. For example, queue manager controls the queueing of messages into and dequeing of messages from failed message queues 122, 123, and 124, system failed message queue 181, and transmission queue 107.

Application specific failed message queues can be created in a variety of ways. In some embodiments, a user creates an application specific failed message queue (e.g., prior to sending any messages) for an application. For example, a user of application 102 can create failed message queue 122, a user of application 103 can create failed message queue 123, and a user of application 104 can create failed message queue 124, etc. Each application can have a one-to-one correspondence with a created failed message queue. For example, correspondence 162 (a dotted line) represents a one-to-one correspondence between application 102 and failed message queue 122. Similar one-to-once correspondences between application 103 and failed message queue 123 and between application 104 and failed message queue 124 are represented by correspondences 163 and 164 (also dotted lines) respectively Accordingly, when sending a message to a target queue (e.g., to receive queue 117), a user includes a reference (e.g., a Uniform Resource Locator ("URI")) to the failed message queue in part of the message (e.g., in a message header). For example, application 103 can include error queue reference 144, referencing failed message queue 123, in enqueue message 141. Correspondingly, when receiving message 141, queue manager 108 also receives the reference failed message queue 123.

In other embodiments, when an application comes up (or is instantiated) the application can cause a corresponding application specific failed message queue to come up along with the application. For example, when application 102 comes up it can cause failed message queue 122 to come up at relatively the same time. An application can cause an application specific failed message queue to come up by sending commands to queue manager 108. For example, application 102 can send commands to queue manager 108 that cause queue manager 108 to create failed message queue 123. Similar to user-created application specific failed message queues, application 102 can then include a reference to an application created specific failed message queue in messages sent to a target queue.

In yet other embodiments, a queue manager, such as, for example, queue manager 108, creates application specific failed message queues dynamically as application specific failed message queues are needed. For example, when receiving a message from an application, queue manager 108 can determine if the application already has a corresponding application specific failed message queue. If not, queue manager 108 can create a corresponding application specific failed message queue for the application.

Queue manager 108 can return a reference to the application specific failed message queue reference back to the corresponding application. For example, queue manager 108 can pass a URI for failed message queue 123 back to application 103. Application 103 can use the URI in subsequent queued messages to indicate to queue manager 108 that failed messages corresponding to application 103 are to be moved to failed message queue 123.

In any event, application specific failed message queues (created using any creation mechanism) facilitate isolation of failed messages. For example, security mechanisms can be placed on application specific failed message queues that allow only the corresponding application (and/or some other designated failed message processing application) to access an application specific failed message queues. For example, security mechanism can prevent applications 103 and 104 form accessing failed message queue 122.

Queue manager 108 also includes system failed message queue 181. System failed message queue 181 can function as a default for messages that are not associated with an application specific failed message queue. System failed message queue 181 can also be used if a failed message can not be placed into and/or is not retrievable from a corresponding application specific failed message queue.

Each of applications 102, 103 and 104 may also have access to a URI for receive queue 117 such that applications 102, 103, and 104 can send messages for queued transmission. Thus, for example, application 102 can send a message to queue manager 108 and queue manager 108 can enqueue the message (e.g., using a capture protocol) in transmission queue 107 for transfer to receive queue 118 and subsequent delivery to application 112.

Computer system 111 includes queue manager 118 and application 112. Queue manager 108 includes and controls receiving queue 117. For example, queue manager 118 controls the queuing of messages into and dequeueing of messages from receiving queue 117. Thus, for example, receiving queue 117 can receive a message from network 105 and enqueue the message in receive queue 117. Subsequently, queue manager 118 can dequeue the message and send the message to application 112 (e.g., using a delivery protocol). Application 112 can be a portion of a distributed application, such as, for example, a Web service. For example, application 112 and one or more of applications 102, 103 and 104 can be portions of the same distributed application. URIs can be used to facilitate communication between receiving queue 117 and application 112.

Figure 2:
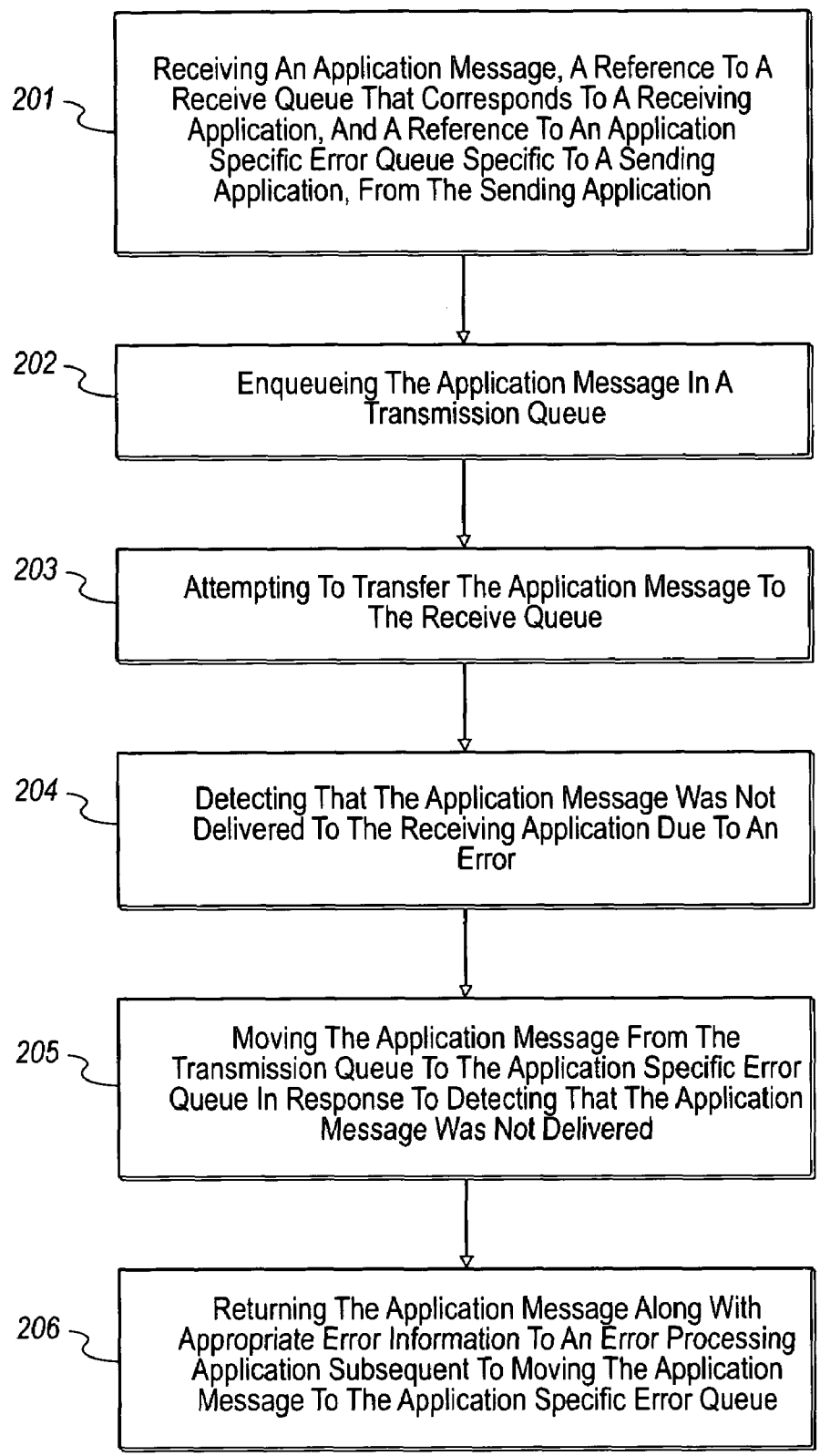
FIG. 2 illustrates an example flow chart of a method for failed message recovery using application specific error queues.

FIG. 1A further depicts how an application specific error queue facilitates message recovery when a transfer error occurs. FIG. 1B further depicts how an application specific error queue facilitates message recovery when a delivery error occurs. FIG. 2 illustrates an example flow chart of a method 200 for failed message recovery using application specific error queues. Method 200 will be described with respect to the components and data in FIG. 1A and then method 200 will be described with respect to the components and data in FIG. 1B.

Referring now to FIG. 1A, application 103 (or an intermediate queue channel positioned between application 103 and queue manger 108) can send enqueue message 141 (e.g., as part of a capture protocol), including application message 142, receive queue reference 143, and error queue reference 144 to queue manager 108. Receive queue reference 143 and error queue reference 144 can be, for example, URIs identifying receive queue 117 and failed message queue 123 (the application specific failed message queue corresponding to application 103) respectively. Application 103 can associate application message 142 with failed message queue 123 by including error queue reference 144 as a parameter to a send operation or as a property on message 142.

Method 200 includes an act of receiving an application message, a reference to a receive queue that corresponds to a receiving application, and a reference to an application specific error queue specific to a sending application, from the sending application (act 201). For example, transmission queue 107 can receive enqueue message 141. Enqueue message 141 includes application message 142, receive queue reference 143 (e.g., a URI identifying receive queue 117), and error queue reference 144 (e.g., a URI identifying failed message queue 123). Enqueue message 141 can be of a formatted similar to:

```
<Envelope>
    <Headers>
        <ReceiveQueueId>ReceiveQueueURI</ReceiveQueueId>
        <ErrorQueueId>ErrorQueueURI</ErrorQueueId>
    </Headers>
    <Body>
        [application message]
    </Body>
</Envelope>
```

Method 200 includes an act of enqueueing the application message in a transmission queue (act 202). For example in FIG. 1A, queue manager 108 can enqueue application message 142 in transmission queue 107. Queue manager 108 can also maintain the association between application message 142 and error queue reference 144. For example, error queue reference 144 can be stored along with application message 142 in transmission queue 107.

Method 200 includes an act of attempting to transfer the application message to the receive queue (act 203). For example, queue manager 108 can utilize receive queue reference 143 to attempt to transfer application message 142 to receive queue 117. In some embodiments, application message 142 is transferred in accordance with a transfer protocol and is contained within a transfer message, such as, for example, transfer message 146.

Method 200 includes an act of detecting that the application message was not delivered to the receiving application due to an error (act 204). As depicted in FIG. 1A, transfer message 146 does not arrive at queue manager 118. Thus, queue manager 108 can detect that application message 142 was not delivered to application 112. Detecting that an application was not delivered to application can result from a variety of different errors, such as, for example, transfer errors and delivery errors. In FIG. 1A, queue manager 108 detects a transfer error. A transfer error can occur, for example, as a result of a persistent lack of connectivity between queue manager 108 and queue manager 118, as a result of receive queue 117 being down, as a result of receive queue reference 143 not actually referencing receive queue 177 (e.g., a bad URI), as a result of exceeding a limit on queue quota of receiving queue manager 118, as a result of lost and negative acknowledgments from receiving queue manager 118, etc A transfer error can be detected as a result of expiration of a timeout period. For example, if queue manger 108 does not receive an acknowledgement from queue manager 118 (acknowledging receipt of transfer message 146) within a specific timeout period, queue manager 108 can be configured to process application message 142 as a failed message. A transfer error can also be detected as an express error from the receiving queue manager. For example, queue manager 118 can indicate to queue manager 108 that application 103 is not authorized to send messages to application 112.

When a transfer error is detected, queue manager 108 can generate and/or receive error information, such as, for example, a message status and error type, describing the error. A message status (e.g., status 147) indicates the resulting status of a failed message (e.g., Not Transferred). An error type (e.g., error type 148) indicates the type of error that was detected (e.g., Timeout, Receive Queue Not Available, etc.).

Method 200 includes an act of moving the application message from the transmission queue to the application specific error queue in response to detecting that the application message was not delivered (act 205). For example, queue manager 108 can utilize error queue reference 144 to move application message 142 from transmission queue 107 to failed message queue 123. Queue manager 108 can move application message 142 in response to detecting (or at least being configured to assume when a timeout period expires) that transfer message 146 was not transferred to manager 118. Moving application message 142 to application specific failed message queue 123 isolates application message 142 such that applications 102 and 104 are prevented form accessing application message 142. However, application 103 and/or application 103' can efficiently access application message 142 since it is already known that messages in application specific failed message queue 123 correspond specifically to application 103.

Queue manager 108 can also associate appropriate error information (e.g., status 147 and error type 148) with application message 142. Error information may be stored in failed message queue 123 along with application 142.

From time to time, or at some specified interval, application 103 can poll failed message queue 123 for failed messages. Alternately, queue manger 108 can implement a triggering mechanism that contacts application 103 when available failed messages are stored in failed message queue 123. In some embodiments, application 103' (a separate different error processing application) processes failed messages sent by application 103. Thus, application 103' can poll message queue 123 from time to time to check for failed messages. Application 103 can also include a URI to application 103' in messages that are sent to queue manager 108 such that a trigger mechanism can contact application 103' when there are available failed messages in message queue 123.

Method 200 includes an act of returning the application message along with appropriate error information from the application specific error queue to an error processing application subsequent to moving the application message to the application specific error queue (act 206). In some embodiments, the error processing application is a different application than the sending application. For example, in response to being polled by application 103', queue manager 108 can return dequeue response 149 from failed message queue 123 to application 103'. Dequeue response 149 includes application message 142, status 147, and error type 148. Application message 142 can be encapsulated in the body portion of dequeue response 149. Status 147 and error type 148 can be included in message headers. Thus, dequeue response 149 can be formatted similar to:

```
<Envelope>
    <Headers>
        <MessageStatus>Status </MessageStatus>
        <ErrorType>ErrorType</ErrorType>
    </Headers>
    <Body>
        [application message]
    </Body>
</Envelope>
```

Subsequently, application 103' can access and process application message 142, status 147, and error type 148 to determine any further/corrective action for application message 142, such as, for example, retrying message 142.

In other embodiments, the error processing application is the sending application. For example, in response to being polled by application 103, queue manager 108 can return dequeue response 149 from failed message queue 123 to application 103.

Referring now to method 200 with reference to the components and data in FIG. 1B, application 104 (or an intermediate queue channel positioned between application 104 and queue manger 108) can send enqueue message 159 (e.g., as part of a capture protocol), including application message 132, receive queue reference 143, and error queue reference 164 to queue manager 108. Enqueue message 159 can be formatted similarly to enqueue message 141. Error queue reference 164 can be, for example, a URI identifying failed message queue 124 (the application specific failed message queue corresponding to application 104) respectively. Application 104 can associate application message 132 with failed message queue 124 by including error queue reference 164 as a parameter to a send operation or as a property on message 132.

Transmission queue 107 can receive enqueue message 156 (act 201). Enqueue message 156 includes application message 132, receive queue reference 143 (e.g., a URI identifying receive queue 117), and error queue reference 164 (e.g., a URI identifying failed message queue 124). Enqueue message 159 can be of a format similar to enqueue message 141.

Queue manager 108 can enqueue application message 132 in transmission queue 107 (act 202). Queue manager 108 can also maintain the association between application message 132 and error queue reference 164. For example, error queue reference 164 can be stored along with application message 132 in transmission queue 107.

Queue manager 108 can utilize receive queue reference 143 to attempt to transfer application message 132 to receive queue 117 (act 203). In some embodiments, application message 132 is transferred in accordance with a transfer protocol and is contained within a transfer message, such as, for example, transfer message 166. As depicted in FIG. 1B, transfer message 166, containing application message 132 is successfully transferred to queue manager 118. Queue manger 118 can subsequently enqueue application message 132 in receive queue 117 for delivery to application 112.

Subsequently, queue manager 118 can send delivery message 172 (e.g., as part of a delivery protocol), containing application message 132, to application 112. However, also as depicted in FIG. 1B, delivery message 172 does not arrive at application 112. A delivery failure can occur as a result of a variety of different errors, such as, for example, a receiving application not running, a receiving application not picking up its messages (a timeout), a persistent failure in the receiver that causes receive transactions to abort, etc. In response to a delivery failure, queue manager 118 can send error report 171 to queue manager 108. Error report 171 can include error information, such as, for example, a message status and error type associated with the delivery failure.

Queue manager 108 can receive error report 171 and detect that application message 132 was not delivered to application 112. Thus in FIG. 1B, queue manager 108 detects a delivery error (act 204). Queue manager 108 can prepare appropriate error information such as, for example, a message status and error type associated with the delivery error. A message status (e.g., status 167) indicates the resulting status of the dead message (e.g., Not Delivered, Not Delivered and In Doubt). An error type (e.g., error type 168) indicates the type of error that was detected (e.g., Aborted, etc.).

Queue manager 108 can utilize error queue reference 164 to move application message 132 from transmission queue 107 to failed message queue 124, in response to receiving error report 171 (and thus detecting that application message 132 was not received at application 112) (act 205). Queue manager 108 can also associate appropriate error information (e.g., status 167 and error type 168) with application message 132. Error information may be stored in failed message queue 124 along with application 132.

In response to being polled by application 104 (or as a result of some triggering mechanism), queue manager 108 can return dequeue response 169 from failed message queue 124 to application 104 (act 206). Application 104 can receive dequeue response 169. Dequeue response 169 includes application message 132, status 167, and error type 168. Dequeue response 169 can be formatted similar to dequeue response 149. Alternately, queue manager 108 can return dequeue response 169 to a different error processing application that corresponds to application 104 (not shown). The different error processing application can receive dequeue message 169.

Subsequently, application 104 (or the different error processing application) can access and process application message 132, status 167, and error type 168 to determine any further/corrective action for application message 132, such as, for example, retrying application message 132.

In some embodiments, a sending application uses a transaction when capturing messages to a transmission queue. This increases the likelihood of consistency between the application's durable state and the state of its messages and provides for reliability in the initial capture process. Error handling after the capture transaction is committed permits the sending application to perform compensation.

Likewise, a receiving application may dequeue a message using a transaction. This helps ensure that the message is successfully read and processed when the receiver's transaction commits. If the transaction aborts, the message was not successfully processed. Depending on the receiver's queue manager, such a failure may be retried (e.g., in the case of transient failures such as database unavailability), may require receiver-side error handling, or the receiving side queue manager may return a delivery failure error to the sending side queue manager which causes the sending side queue manager to put the message into the appropriate application specific failed message queue.

The message transfer process can utilize acknowledgements ("ACKs") indicating successful transfers. A sending side queue manager may, for example, fail a message for which it does not receive an acknowledgement within a specified time window. A timeout window can be configured to be longer than the timeout of underlying protocols, such as, for example, TCP and direct WS-RM, but still permits error detection in the event of persistent interruption of service.

In some embodiments, capture (enqueue) messages are SOAP messages which contained the failed message queue address as a SOAP header on the capture message and the actual application message fully encapsulated in the body of the capture message. The capture message also includes a TimeToLive (timeout) header indicating how long the sending side queue manager should wait before considering the message dead.

In other embodiments, and as previously described, a failed message queue address as well as other values can be part of a send call's parameters and/or the properties of the message.

Thus, embodiments of the present invention facilitate failed message recovery without an application having to consume the resources necessary to search a shared failed message queue for corresponding failed messages. Further, since failed messages are aggregated in application specific error queues, sending applications are relived from having to know error queue addresses for each receiving application to which messages are sent. Accordingly, applications have more efficient access to corresponding failed messages and relevant error information.

Figure 3:
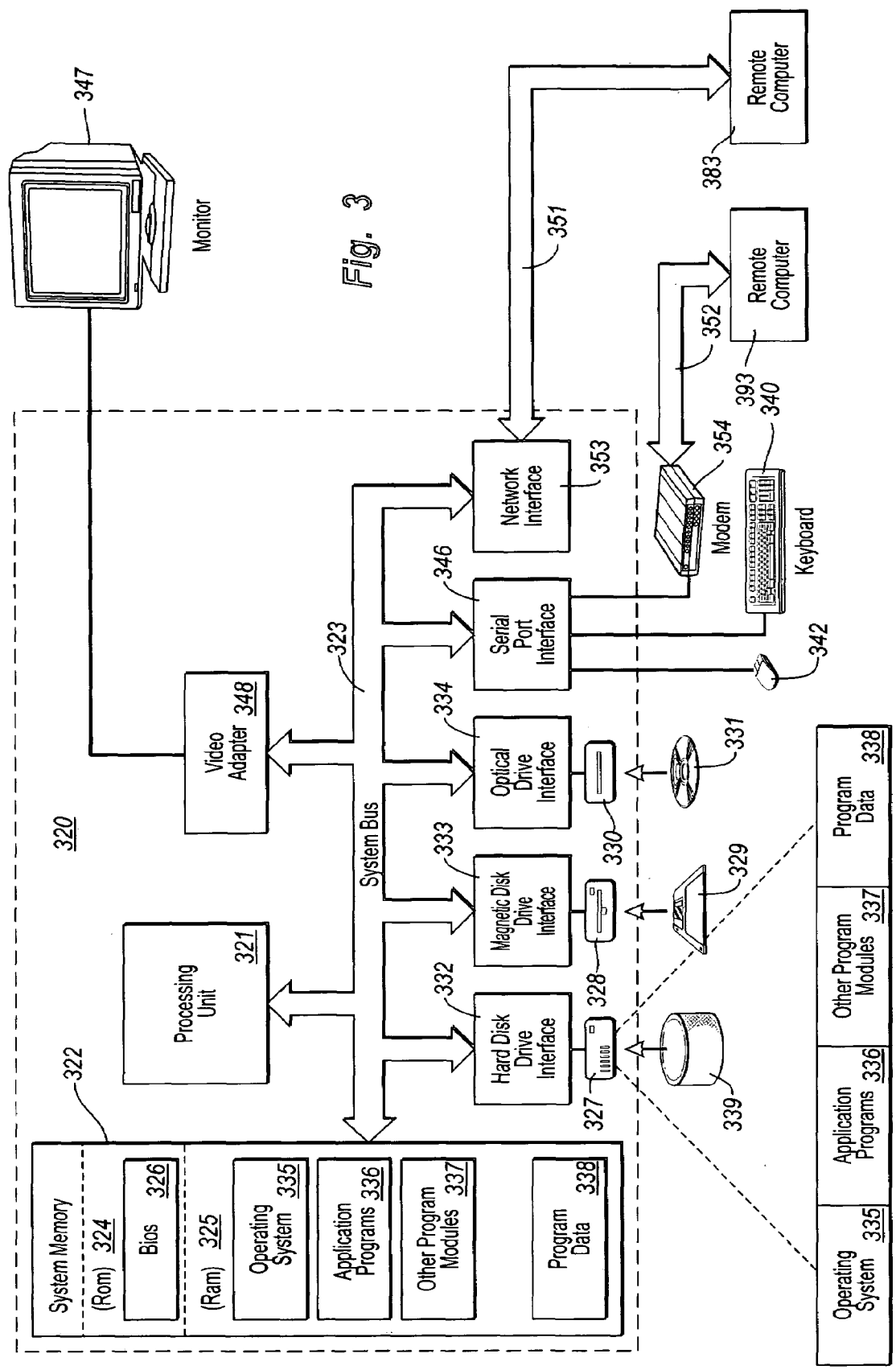
FIG. 3 illustrates a suitable operating environment for the principles of the present invention.

FIG. 3 illustrates a suitable operating environment for the principles of the present invention. FIG. 3 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 3, an example system for implementing the invention includes a general-purpose computing device in the form of computer system 320, including a processing unit 321, a system memory 322, and a system bus 323 that couples various system components including the system memory 322 to the processing unit 321. Processing unit 321 can execute computer-executable instructions designed to implement features of computer system 320, including features of the present invention. The system bus 323 may be any of several types of bus structures including a memory bus or memory controller, a peripheral bus, and a local bus using any of a variety of bus architectures. The system memory includes read only memory ("ROM") 324 and random access memory ("RAM") 325. A basic input/output system ("BIOS") 326, containing the basic routines that help transfer information between elements within computer system 320, such as during start-up, may be stored in ROM 324.

The computer system 320 may also include magnetic hard disk drive 327 for reading from and writing to magnetic hard disk 339, magnetic disk drive 328 for reading from or writing to removable magnetic disk 329, and optical disk drive 330 for reading from or writing to removable optical disk 331, such as, or example, a CD-ROM or other optical media. The magnetic hard disk drive 327, magnetic disk drive 328, and optical disk drive 330 are connected to the system bus 323 by hard disk drive interface 332, magnetic disk drive-interface 333, and optical drive interface 334, respectively. The drives and their associated computer-readable media provide non-volatile storage of computer-executable instructions, data structures, program modules, and other data for the computer system 320. Although the example environment described herein employs magnetic hard disk 339, removable magnetic disk 329 and removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 339, magnetic disk 329, optical disk 331, ROM 324 or RAM 325, including an operating system 335, one or more application programs 336, other program modules 337, and program data 338. A user may enter commands and information into computer system 320 through keyboard 340, pointing device 342, or other input devices (not shown), such as, for example, a microphone, joy stick, game pad, scanner, or the like. These and other input devices can be connected to the processing unit 321 through input/output interface 346 coupled to system bus 323. Input/output interface 346 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 347 or other display device is also connected to system bus 323 via video interface 348. Other peripheral output devices (not shown), such as, for example, speakers and printers, can also be connected to computer system 320.

Computer system 320 is connectable to networks, such as, for example, an office-wide or enterprise-wide computer network, a home network, an intranet, and/or the Internet. Computer system 320 can exchange data with external sources, such as, for example, remote computer systems, remote applications, and/or remote databases over such networks.

Computer system 320 includes network interface 353, through which computer system 320 receives data from external sources and/or transmits data to external sources. As depicted in FIG. 3, network interface 353 facilitates the exchange of data with remote computer system 383 via link 351. Network interface 353 can logically represent one or more software and/or hardware modules, such as, for example, a network interface card and corresponding Network Driver Interface Specification ("NDIS") stack. Link 351 represents a portion of a network (e.g., an Ethernet segment), and remote computer system 383 represents a node of the network.

Likewise, computer system 320 includes input/output interface 346, through which computer system 320 receives data from external sources and/or transmits data to external sources. Input/output interface 346 is coupled to modem 354 (e.g., a standard modem, a cable modem, or digital subscriber line ("DSL") modem) via link 359, through which computer system 320 receives data from and/or transmits data to external sources. As depicted in FIG. 3, input/output interface 346 and modem 354 facilitate the exchange of data with remote computer system 393 via link 352. Link 352 represents a portion of a network and remote computer system 393 represents a node of the network.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

In accordance with the present invention, modules including applications, queue managers, transmission queues, receiving queues, and application specific failed message queues, as well as associated data, including application messages, enqueue messages, dequeue responses, transfer messages, and queue references (URIs) can be stored and accessed from any of the computer-readable media associated with computer system 320. For example, portions of such modules and portions of associated program data may be included in operating system 335, application programs 336, program modules 337 and/or program data 338, for storage in system memory 322.

When a mass storage device, such as, for example, magnetic hard disk 339, is coupled to computer system 320, such modules and associated program data may also be stored in the mass storage device. In a networked environment, program modules depicted relative to computer system 320, or portions thereof, can be stored in remote memory storage devices, such as, system memory and/or mass storage devices associated with remote computer system 383 and/or remote computer system 393. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for use at a computer system that is network connectable along with one or more other computer systems to a network, the computer system including a processor and system memory, the computer system including a queue manager that controls one or more message queues at the computer system, the method for recovering from an messaging error, the method comprising:

an act of receiving an enqueue message from a sending application, the enqueue message including:
an application message;
a receive queue reference, the receive queue reference identifying a receive queue that corresponds to a corresponding receiving application; and
an error queue reference specifying an application specific error queue for the sending application, the application specific error queue being a queue where failed application messages of the sending application are to be sent, the application specific error queue exclusively for the use of the sending application to isolate messages of the sending application from other applications such that other applications are prevented from accessing failed application messages of the sending application;

an act of enqueueing the application message in a transmission queue;
an act of attempting to transfer the application message to the receive queue;
an act of detecting that the application message was not delivered to the receiving application due to an error;
an act of identifying the application message as a failed application message in response to detecting that the application message was not delivered;
an act of the processor moving the failed application message from the transmission queue to the application specific error queue for the sending application in response to detecting that the application message was not delivered, moving the failed application message to the application specific error queue preventing other applications at the computer system from accessing the failed application message; and
an act of returning the failed application message along with appropriate error information from the application specific error queue to an error processing application configured specifically to handle failed application messages of the sending application, the failed application message return to the error processing application subsequent to moving the failed application message to the application specific error queue for the sending application.

2. The method as recited in claim 1, wherein the act of receiving an enqueue message comprises an act of receiving the error queue reference as a parameter to a send operation.

3. The method as recited in claim 1, wherein the act of receiving an enqueue message comprises an act of receiving the error queue reference as a property on the application message.

4. The method as recited in claim 1, wherein the act of detecting that the application message was not delivered to the receiving application due to an error comprises an act of detecting a transfer error.

5. The method as recited in claim 4, wherein the act of detecting a transfer error comprise an act of detecting an error selected from among the following errors: expiration of a timeout period, persistent lack of connectivity between the transmission queue and the receive queue, non-existence of the receive queue, unauthorized sending application, limits on queue quota one the receiving queue manager, and lost and negative acknowledgments form the receiving queue manager.

6. The method as recited in claim 1, wherein the act of detecting that the application message was not delivered to the receiving application due to an error comprises an act of detecting a delivery error.

7. The method as recited in claim 6, wherein the act of detecting a delivery error comprise an act of detecting an error selected from among the following errors: the receiving application not running, the receiving application not pickup up its messages, and a persistent failure in the receiver that causes receive transactions to abort.

8. The method as recited in claim 1, wherein the act of detecting that the application message was not delivered to the receiving application due to an error comprises an act of receiving error report from a receiving side queue manager that controls the receive queue.

9. The method as recited in claim 1, wherein the act of moving the application message from the transmission queue to the application specific error queue comprises an act of associating a message status and error type with the application message.

10. The method as recited in claim 9, wherein the act of associating a message status and error type with the application message comprises an act of association a message status with the message, the message status selected from among: Not Transferred and Not Delivered and In Doubt.

11. The method as recited in claim 9, wherein the act of associating a message status and error type with the application message comprises an act of association an error type with the message, the error type selected from among: timeout and aborted.

12. The method as recited in claim 1, wherein the act of returning the failed application message along with appropriate error information from the application specific error queue to an error processing application comprises an act of returning a message status and error type to the sending application.

13. The method as recited in claim 1, further comprising:
an act of creating the application specific error queue for use in isolating failed messages sent from the sending application.

14. The method as recited in claim 1, further comprising:
an act of receiving a second enqueue message from a second sending application, the second enqueue message including:
a second application message;
a second receive queue reference, the second receive queue reference identifying a second different receive queue corresponding to a second different receiving application; and
a second error queue reference specifying a second different application specific error queue for the second sending application, the second application specific error queue being a queue where failed application messages of the second sending application are to be sent, the second application specific error queue exclusively for the use of the second sending application to isolate messages of the sending application from other applications, including the sending application, such that other applications, including the sending application, are prevented from accessing failed application messages of the second sending application;
an act of attempting to transfer the second application message to the second receive queue;
an act of detecting that the second application message was not delivered to the second receiving application due to an error; and
an act of identifying the second application message as a failed second application message in response to detecting that the second application message was not delivered;
an act of moving the second failed application message from the transmission queue to the second application specific error queue in response to detecting that the second application message was not delivered, moving the failed application message to the application specific error queue preventing other sending applications, including the sending application, from accessing the failed second application message.

15. A computer program product for use at a computer system that is network connectable along with one or more other computer systems to a network, the computer system including a queue manager that controls one or more message queues at the computer system, the computer program product for implementing a method for recovering from an messaging error, the computer program product comprising one or more computer-readable media having stored thereon computer-executable instructions that, when executed by a processor, cause the compute system to perform the following:
receive an enqueue message from a sending application, the enqueue message including:
an application message;
a receive queue reference, the receive queue reference identifying a receive queue that corresponds to a corresponding receiving application; and
an error queue reference to an application specific error queue for the sending application, the application specific error queue being a queue where failed application messages of the sending application are to be sent, the application specific error queue exclusively for the use of the sending application to isolate messages of the sending application from other applications such that other applications are prevented from accessing failed application messages of the sending application;
enqueue the application message in a transmission queue;
attempt to transfer the application message to the receive queue;
detect that the application message was not delivered to the receiving application due to an error;
identify the application message as a failed application message in response to detecting that the application message was not delivered;
move the failed application message from the transmission queue to the application specific error queue for the sending application in response to detecting that the application message was not delivered, moving the failed application message to the application specific error queue preventing other applications at the computer system from accessing the failed application message; and
return the failed application message along with appropriate error information from the application specific error queue to an error processing application configured specifically to handle failed application messages of the sending application, the failed application message returned to the error processing application subsequent to moving the application message to the application specific error queue for the sending application.

16. The computer program product as recited in claim 15, wherein computer-executable instructions that, when executed, cause the computer system to detect that the application message was not delivered to the receiving application due to an error comprise computer-executable instructions that, when executed, cause the computer system to detect a transfer error.

17. The computer program product as recited in claim 15, wherein computer-executable instructions that, when executed, cause the computer system to detect that the application message was not delivered to the receiving application due to an error comprise computer-executable instructions that, when executed, cause the computer system to detect a delivery error.

18. A computer system, the computer system comprising:
a processor;
a system memory; and
one or more computer-readable media having stored thereon computer-executable instructions that, when executed by a processor, implement a queue manager, the queue manager being configured to:
receive an enqueue message from a sending application, the enqueue message including:
an application message;

a receive queue reference, the receive queue reference identifying a receive queue that corresponds to a corresponding receiving application; and an error queue reference to an application specific error queue for the sending application, the application specific error queue being a queue where failed application messages of the sending application are to be sent, application specific error queue exclusively for the use of the sending application to isolate messages of the sending application from other applications such that other applications are prevented from accessing failed application messages of the sending application;

enqueue the application message in a transmission queue;

attempt to transfer the application message to the receive queue;

detect that the application message was not delivered to the receiving application due to an error;

identify the application message as a failed application message in response to detecting that the application message was not delivered;

move the failed application message from the transmission queue to the application specific error queue for the sending application in response to detecting that the application message was not delivered, moving the failed application message to the application specific error queue preventing other applications at the computer system from accessing the failed application message; and return the failed application message along with appropriate error information from the application specific error queue to an error processing application configured specifically to handle failed application messages of the sending application, the failed application message returned to the error processing application subsequent to moving the application message to the application specific error queue for the sending application.

* * * * *